United States Patent
Hong

(10) Patent No.: US 7,613,286 B2
(45) Date of Patent: Nov. 3, 2009

(54) AUTOMATIC IDENTIFICATION AND BLOCKING METHOD OF SPAM CELL

(75) Inventor: Se Chul Hong, Sungnam (KR)

(73) Assignee: Uangel Corporation, Sungnam (KR)

( * ) Notice: Subject to any disclaimer, the term of this patent is extended or adjusted under 35 U.S.C. 154(b) by 603 days.

(21) Appl. No.: 11/512,223

(22) Filed: Aug. 30, 2006

(65) Prior Publication Data

US 2007/0283006 A1 Dec. 6, 2007

Related U.S. Application Data

(60) Provisional application No. 60/810,148, filed on Jun. 2, 2006.

(51) Int. Cl.
*H04M 3/436* (2006.01)
*H04M 1/57* (2006.01)
*H04M 7/00* (2006.01)

(52) U.S. Cl. ............. 379/210.02; 379/196; 379/207.15; 379/210.03; 379/221.09

(58) Field of Classification Search ....................... None
See application file for complete search history.

(56) References Cited

U.S. PATENT DOCUMENTS

| | | | | |
|---|---|---|---|---|
| 6,130,937 A * | 10/2000 | Fotta | ............................ | 379/200 |
| 6,307,926 B1 * | 10/2001 | Barton et al. | ................ | 379/189 |
| 6,330,317 B1 * | 12/2001 | Garfinkel | ..................... | 379/196 |
| 6,385,310 B1 * | 5/2002 | Holiday, II | ................... | 379/120 |
| 6,477,246 B1 * | 11/2002 | Dolan et al. | ........... | 379/211.02 |
| 6,549,619 B1 * | 4/2003 | Bell et al. | .............. | 379/210.02 |
| 6,788,773 B1 * | 9/2004 | Fotta | ............................ | 379/200 |
| 6,853,717 B1 * | 2/2005 | Frentz et al. | ............ | 379/210.02 |
| 6,990,187 B2 * | 1/2006 | MacNamara et al. | ... | 379/210.02 |
| 7,079,638 B1 * | 7/2006 | Beauchamp et al. | ........ | 379/196 |
| 7,099,444 B1 * | 8/2006 | Russell | ................... | 379/142.02 |
| 7,158,630 B2 * | 1/2007 | Fotta et al. | ............. | 379/266.08 |
| 7,295,660 B1 * | 11/2007 | Higginbotham et al. | ..... | 379/196 |
| 7,352,855 B2 * | 4/2008 | Bedingfield, Sr. | ....... | 379/210.03 |
| 2004/0196968 A1 * | 10/2004 | Yue | ........................ | 379/210.02 |
| 2005/0207557 A1 * | 9/2005 | Dolan et al. | ........... | 379/210.02 |
| 2005/0271196 A1 * | 12/2005 | Florkey et al. | ......... | 379/210.02 |
| 2007/0071212 A1 * | 3/2007 | Quittek et al. | ......... | 379/210.02 |
| 2007/0165811 A1 * | 7/2007 | Reumann et al. | ....... | 379/201.01 |

* cited by examiner

*Primary Examiner*—Harry S Hong
(74) *Attorney, Agent, or Firm*—Birch, Stewart, Kolasch & Birch, LLP

(57) ABSTRACT

Disclosed herein is a method of visually or auditorily indicating spam status or a spam class for a calling number through a called terminal. The method includes the steps of the destination switching system requesting service from a spam call blocking server by delivering the calling number and a called number to the spam call blocking server; the spam call blocking server inquiring about spam status or a spam class for the calling number; if the spam status is 'blocked', or if the spam status is 'blocked' and the spam class is equal to or higher than a predetermined class, the spam call blocking server transmitting the spam status or spam class; the service control system activating caller identification service of a called party; the service control system including information about the spam status or spam class in caller identification information for the caller identification service; the service control system transmitting call connection information and the caller identification information to a destination switching system and, thus, the destination switching system making a call with a called terminal; and the destination switching system delivering the caller identification information to the destination terminal and, thus, providing visual or auditory display through the called terminal.

14 Claims, 11 Drawing Sheets

| Managed item | Description |
|---|---|
| Subscriber telephone number | All, Subscriber telephone number |
| Spam status | 'blocked', 'allowed' |
| Blocked number | |
| Registration time | Time at which blocking was requested and registered |

FIG. 3

| Managed item | Description |
| --- | --- |
| Blocked number | |
| Class | 'high', 'middle', 'low' |
| Classification time | Time at which classification was performed |
| Number of receptions | Number of received calls from this number in subscriber group |

FIG. 4

| Managed item | Description |
|---|---|
| Subscriber telephone number | |
| Blocking class | 'directly blocked number', 'high', 'middle', 'low', 'none' |
| Final called number | Final called number |
| Final reception time | Final reception time |

FIG. 6

There is telephone call 02-1324-5678***

FIG. 9

There is telephone call

[high spam]

AUTOMATIC IDENTIFICATION AND BLOCKING METHOD OF SPAM CELL

This Nonprovisional application claims priority under 35 U.S.C. § 119(e) on U.S. Provisional Application No(s). 60/810,148 filed on Jun. 2, 2006 the entire contents of which are hereby incorporated by reference.

BACKGROUND OF THE INVENTION

1. Field of the Invention

The present invention relates to a method of automatically identifying and blocking spam calls delivered unilaterally from a telephone network to a called party, and allowing the called party to visually/auditorily identify the spam calls.

2. Description of the Related Art

Conventionally, in order to block spam calls, there has been used a scheme in which a called party personally connects to the service center of a corresponding telephone service provider and informs a receptionist of individual spam telephone numbers, thereby blocking the reception of spam calls on a network. Although this scheme can block spam calls from specific spam telephone numbers, the scheme is not sufficient to block spam calls delivered via unspecified telephone numbers because there are few cases where spam calls are delivered from the same calling number to the same called number two or more times. Consequently, the conventional scheme blocks spam calls only from specific telephone numbers.

SUMMARY OF THE INVENTION

Accordingly, the present invention has been made keeping in mind the above problems occurring in the prior art, and an object of the present invention is to provide a function of allowing called parties to easily report received spam calls and share information about reported spam calls, thereby preemptively identifying and blocking spam calls not received by the called parties as well as spam calls received by the called parties. The reason for this is that spam calls are not repeatedly received by the same called party for a short period of time, therefore preemptive identification and blocking are important.

Furthermore, the present invention provides a function of managing the spam degrees of spam calls for respective spam classes, and automatically blocking spam calls according to the class or visually/auditorily indicating the spam classes of spam calls at the time of receiving the spam calls, therefore the called party can reject the reception of the spam calls. Furthermore, these visual identification function can be provided via an existing general telephone.

Furthermore, the present invention provides a function of providing a dedicated telephone with a hot key HOTKEY and performing easy and rapid registration. Furthermore, the present invention can provide various visual/auditory identification functions and a blocking function with respect to spam calls using the dedicated telephone.

Finally, the present invention provides a function of providing spam reporting, spam classification and spam blocking and identification for spam calls received from wired telephone to mobile telephones. Since the spam calls are transmitted from wired telephones to mobile telephones, this provides a very important advantage.

In order to accomplish the above object, the present invention provides a method of visually or auditorily indicating spam status or a spam class for a calling number through a called terminal, including the steps of the destination switching system, which has received a spam call from a spam sender, requesting service from a spam call blocking server by delivering the calling number and a called number to the spam call blocking server; the spam call blocking server, which has received the request for service, inquiring about spam status or a spam class for the calling number using the calling number and the called number; if the spam status is 'blocked', or if the spam status is 'blocked' and the spam class is equal to or higher than a predetermined class, the spam call blocking server transmitting the spam status or spam class to the service control system; the service control system activating caller identification service of a called party; after the activation, the service control system including information about the spam status or spam class in caller identification information for the caller identification service; the service control system transmitting call connection information and the caller identification information to a destination switching system and, thus, the destination switching system making a call with a called terminal; and the destination switching system delivering the caller identification information to the destination terminal and, thus, providing visual or auditory display corresponding to the spam status or spam class through the called terminal.

BRIEF DESCRIPTION OF THE DRAWINGS

The above and other objects, features and advantages of the present invention will be more clearly understood from the following detailed description taken in conjunction with the accompanying drawings, in which:

FIG. 3 shows subscriber-based blocking information stored in a spam call blocking server according to the present invention;

FIG. 4 shows blocked number management information stored in the spam call blocking server according to the present invention;

FIG. 6 shows subscriber information stored in the spam call blocking server in the present invention;

FIG. 9 is a view illustrating visual display using a calling number according to the present invention;

FIG. 10 is a view illustrating visual display using calling name information according to the present invention;

DESCRIPTION OF THE PREFERRED EMBODIMENTS

Figure 1:
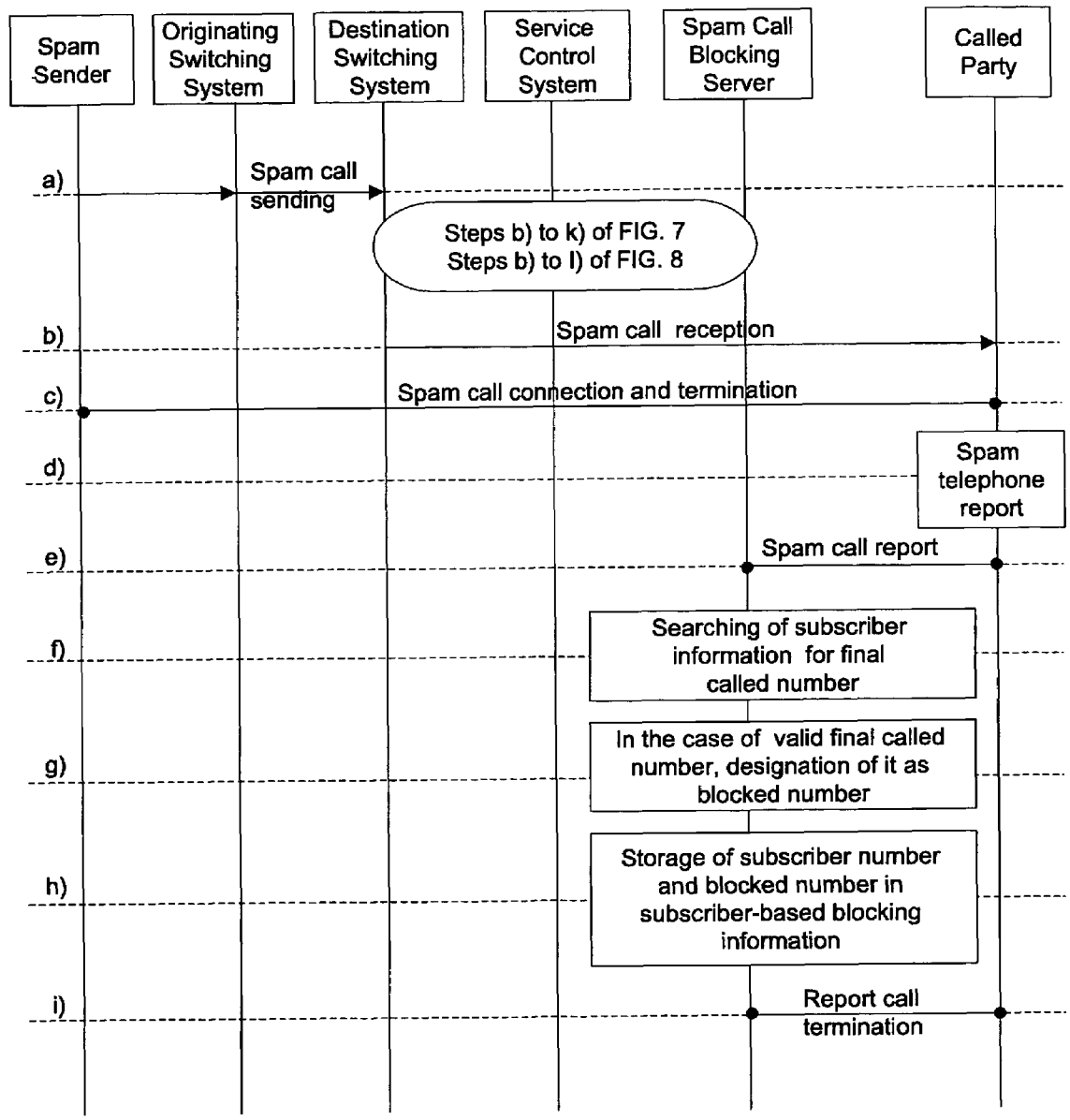
FIG. 1 shows a procedure in which a called party reports spam calls using a general telephone according to the present invention.

Reference now should be made to the drawings, in which the same reference numerals are used throughout the different drawings to designate the same or similar components.

The present invention includes the procedures of reporting spam calls, determining and classifying the spam calls, blocking the spam calls using a telephone network, blocking the spam calls using a terminal, and visually/auditorily identifying the spam calls.

Figure 5:
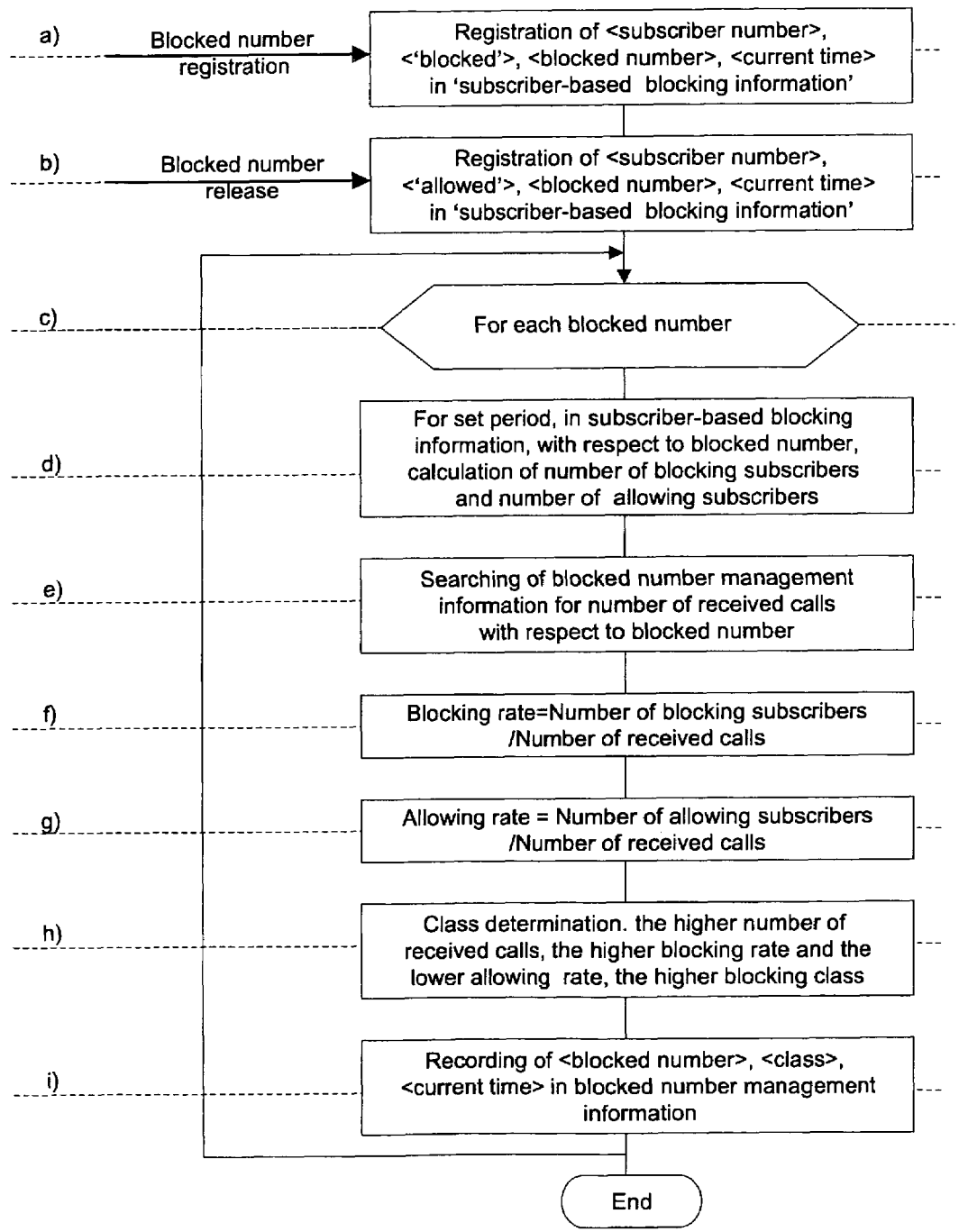
FIG. 5 shows a procedure of registering blocked number information and calculating a class according to the present invention.

FIG. 1 illustrates a procedure of a called party reporting spam calls using an existing general telephone. It is possible to conveniently report spam calls using a general telephone and also report any telephone numbers.

a) A spam sender (device that generates a spam call; the spam sender may be a wired/wireless telephone terminal or a speech processing device such as ARS/IVR.

b) The spam call is received by a called party. In this case, since the called party is a subscriber to the present service, steps b) to k) of FIG. 7 or steps b) to l) of FIG. 8 are performed. In the present process, in the case where a call is blocked, the following steps c) to i) are not performed.

c) The called party terminates the call.

d) In the case of a spam call, the called party makes a call to a designated specific telephone number and reports the spam call.

e) A general telephone originates a call to a short specific telephone number in the form of the specific telephone number+CALL, thereby informing a spam call blocking server that the call received immediately before the report was a spam call. The specific telephone number has the form of *XX+CALL or 1588+CALL. The shorter the telephone number, the better. A calling number may be directly designated in the form of specific telephone number+calling number+CALL. In this case, an arbitrary telephone number may be reported, therefore attention must be paid when using the function.

f) The information of FIG. 6 is searched for a 'final called number'.

g) Using the 'final called time' in the information of FIG. 6, whether the 'final called number' is valid is determined. This step is used to prevent a normal telephone number from being reported as a spam call originating number when a system fails. Such a report is not made under normal conditions.

h) The blocked number is stored as data, such as that of FIG. 3, according to the step a) of FIG. 5.

i) The spam call blocking server automatically terminates the report call.

Figure 2:
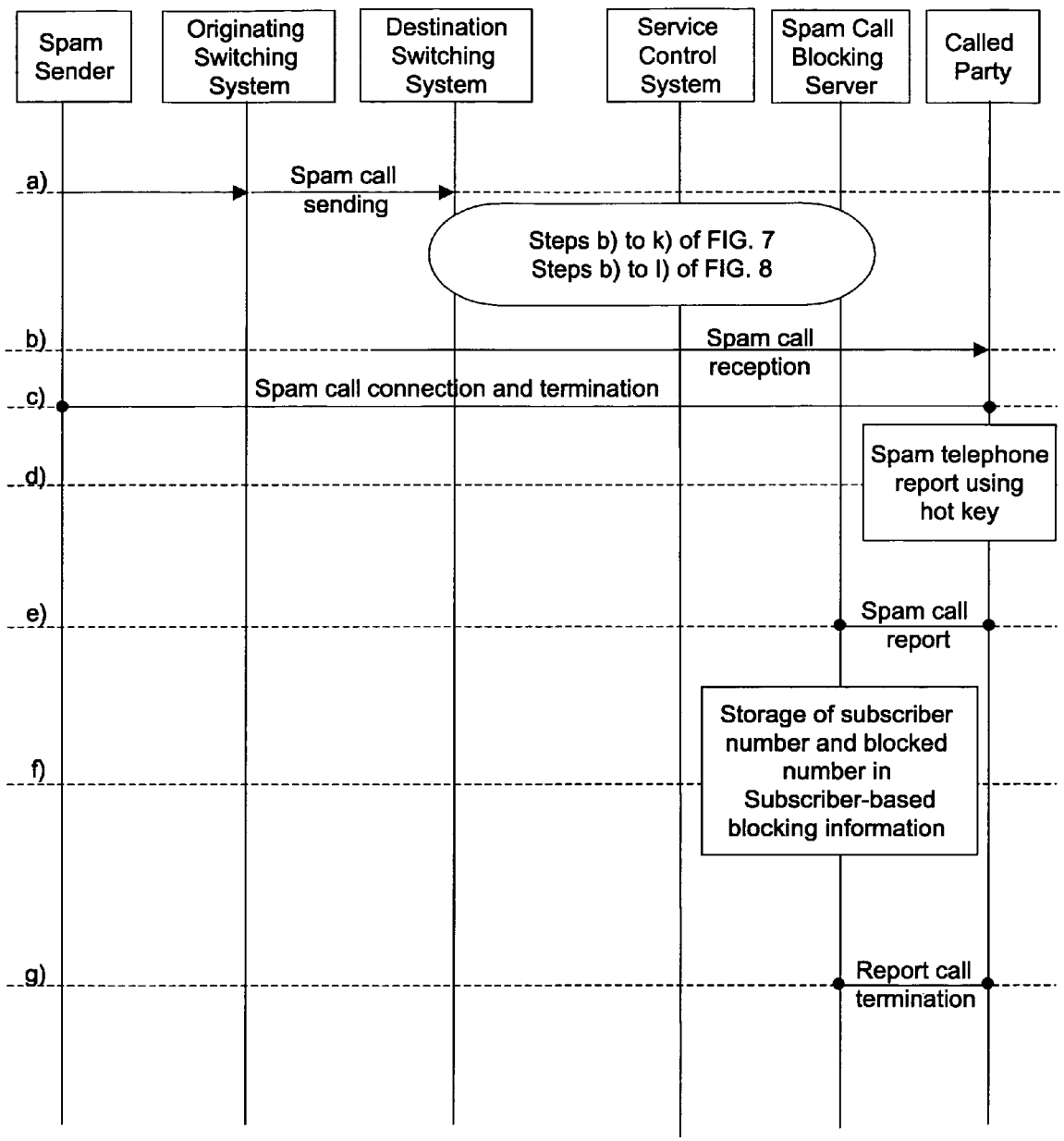
FIG. 2 shows a procedure of reporting spam calls using a dedicated telephone according to the present invention.

FIG. 2 illustrates a procedure of reporting spam calls using a dedicated telephone having a dedicated button (hot key) for spam call reports. The dedicated telephone is a terminal for the present service that has a button (hot key) or menu for reporting spam calls, and can provide a function of recognizing spam calls and spam classes by analyzing calling numbers and calling party names, and a call reception screen, a ring tone and a spam call blocking function.

a) This step is the same as step a) of FIG. 1.

b) This step is the same as step b) of FIG. 1.

c) This step is the same as step c) of FIG. 1.

d) In the case of a spam call, the called party makes a report by selecting the button (hot key) or menu of the dedicated terminal. In this case, the terminal stores the calling number of a call received immediately before the report as a spam call number. Accordingly, the called party is prevented from reporting an arbitrary number.

e) The terminal reports a spam call to the spam call blocking server. The reporting method includes a method of reporting a spam call using a voice call and a method of reporting a spam call via data transmission. In the case of using the voice call, the terminal originates a call in the form of specific telephone number+number to be blocked+CALL. Accordingly, a call may be made in the form of *XX+number to be blocked+CALL, 1588+number to be blocked+CALL. In the method of reporting spam calls using data transmission, a spam call blocking server is connected for data communication, and a "number to be blocked" is transmitted in the form of data.

f) This step is the same as step h) of FIG. 1.

g) The report of the spam call is completed and the connection is released.

However, in the case of the dedicated terminal, using the button (hot key) or menu in a user interface, a call may be originated in the form of (button or menu)+CALL, as in step e) of FIG. 1, and that a call received immediately before the report is a spam call may be reported to the spam call blocking server.

FIG. 3 illustrates the blocking information for each subscriber that is stored in the spam call blocking server. This data is stored and managed to have the following functions.

(1) Telephone numbers to be blocked or allowed for each subscriber are managed. Numbers to be blocked, which are directly set by the subscriber, are used to be blocked at the highest priority. Accordingly, the numbers to be blocked, which exist in this information, have the highest priority, and do not cause any problem even if they are automatically blocked.

(2) For numbers for which calls are determined to be spam calls based on FIG. 4, the data provides a function of allowing a called party to receive calls through the changing of the 'spam state' of the data to 'allow' in the case where the called party desires to receive the calls.

(3) For all of the subscribers, the data is used to block or allow some numbers.

(4) The data is used as information for calculating the data of FIG. 4.

The 'spam state' of FIG. 3 indicates that a subscriber has directly 'blocked' or 'allowed' each blocked number. The 'blocked' state is set based on the procedures of FIGS. 1 and 2, and the 'allowed' state is set in the case where a user explicitly express his or her intention to receive calls from a corresponding number through a customer center or a setting function. In the state of 'allowed', a corresponding subscriber permits calls from a corresponding number even if the number exists in the list of numbers to be blocked of FIG. 4. The setting of 'ALL' for the item 'subscriber telephone number' means that a corresponding measure will be taken for all of the users. Accordingly, through this function, a function of blocking or allowing a specific phone number for all of the subscribers is provided.

FIG. 4 illustrates information for managing blocked numbers and blocking classes, which are analyzed in FIG. 3. This information is periodically analyzed and updated through a procedure, such as the procedure shown in FIG. 5.

FIG. 5 illustrates a procedure of creating and updating the data of FIG. 4. Through this procedure, the spam telephone numbers and classes are determined by analyzing the numbers of subscribers who blocked or allowed calls from respective specific blocked numbers. In this way, the service effect in which calls from the specific blocked numbers are blocked for other subscribers in advance is achieved.

a) This step is the step of setting blocked telephone numbers in FIG. 3 based on FIGS. 1 and 2.

b) This step is the step of allowing the blocked telephone numbers in FIG. 3 at the request of a subscriber.

c) For respective blocked telephone numbers registered in FIG. 3, 'blocked' or 'allowed' is determined and classes are determined, through step d) and its subsequent steps.

d) FIG. 3 is searched for the number of subscribers who blocked or allowed each blocked number. This is referred to as the 'number of blocking subscribers', or the 'number of allowing subscribers'.

e) FIG. 4 is searched for the total 'number of received calls' for a corresponding blocked number.

f) A 'blocking rate' is calculated using an appropriate equation, such as 'blocking rate=number of blocking subscribers/number of received calls'.

g) An 'allowing rate' is calculated using an appropriate equation, such as 'allowing rate=number of allowing subscribers/number of received calls'.

h) Whether to perform blocking or allowing is determined, and classes are determined. The higher the number of received calls, the higher the blocking rate and the lower the allowing rate, the higher the blocking class. In the case of class 'none', blocking is not performed.

i) The results are recorded as the data of FIG. 4.

FIG. 6 is subscriber information that is used to store information about a subscriber. A 'blocking class' is an automatic blocking class that is set by a subscriber. When a class in question is equal to or higher than the set class, a call is blocked in the method illustrated in FIG. 7. A 'final called number' is a number from which a subscriber finally received a call and which was recorded, and is used in FIG. 1.

Figure 7:
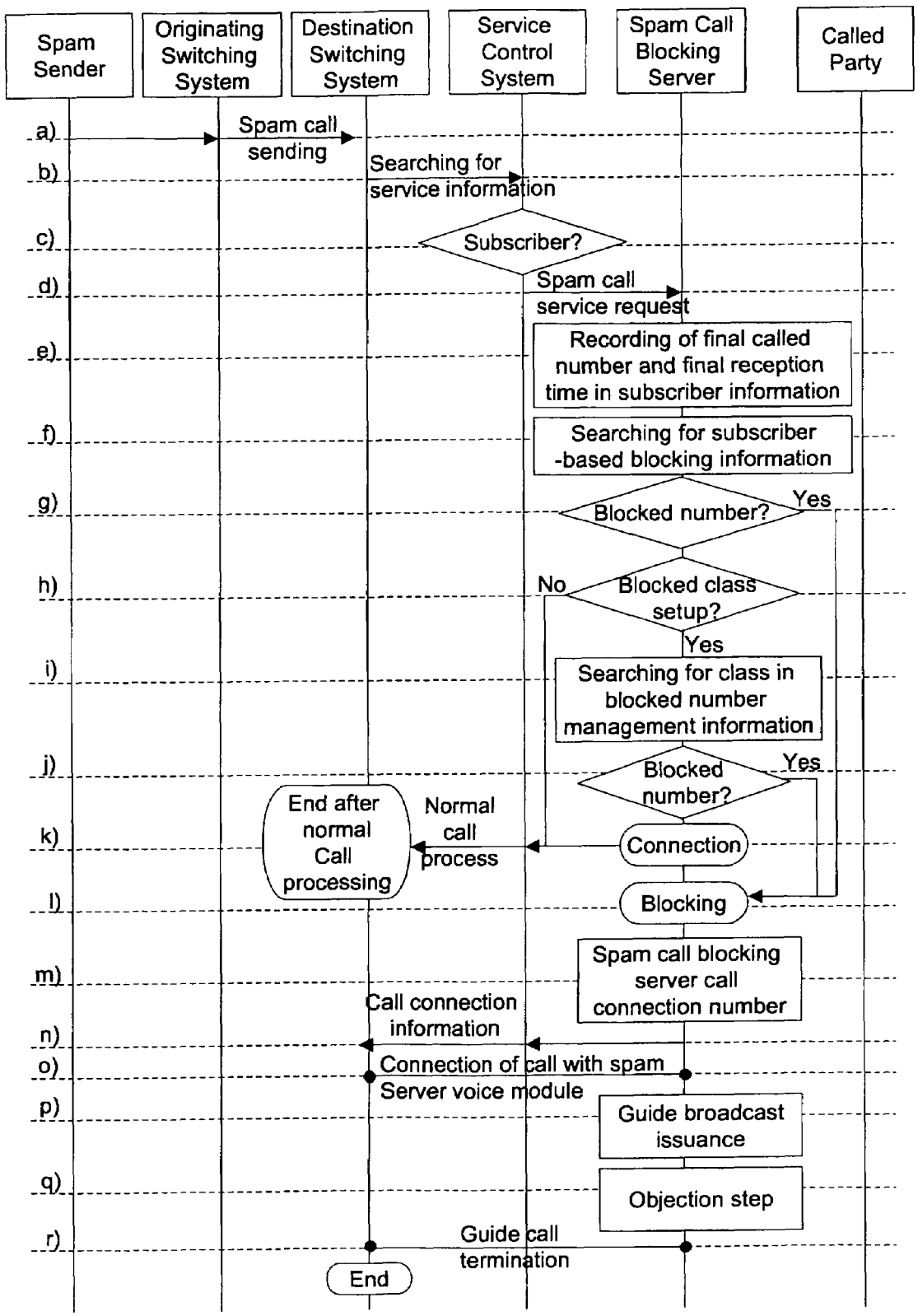
FIG. 7 shows a procedure of automatically blocking spam calls according to the present invention.
Figure 8:
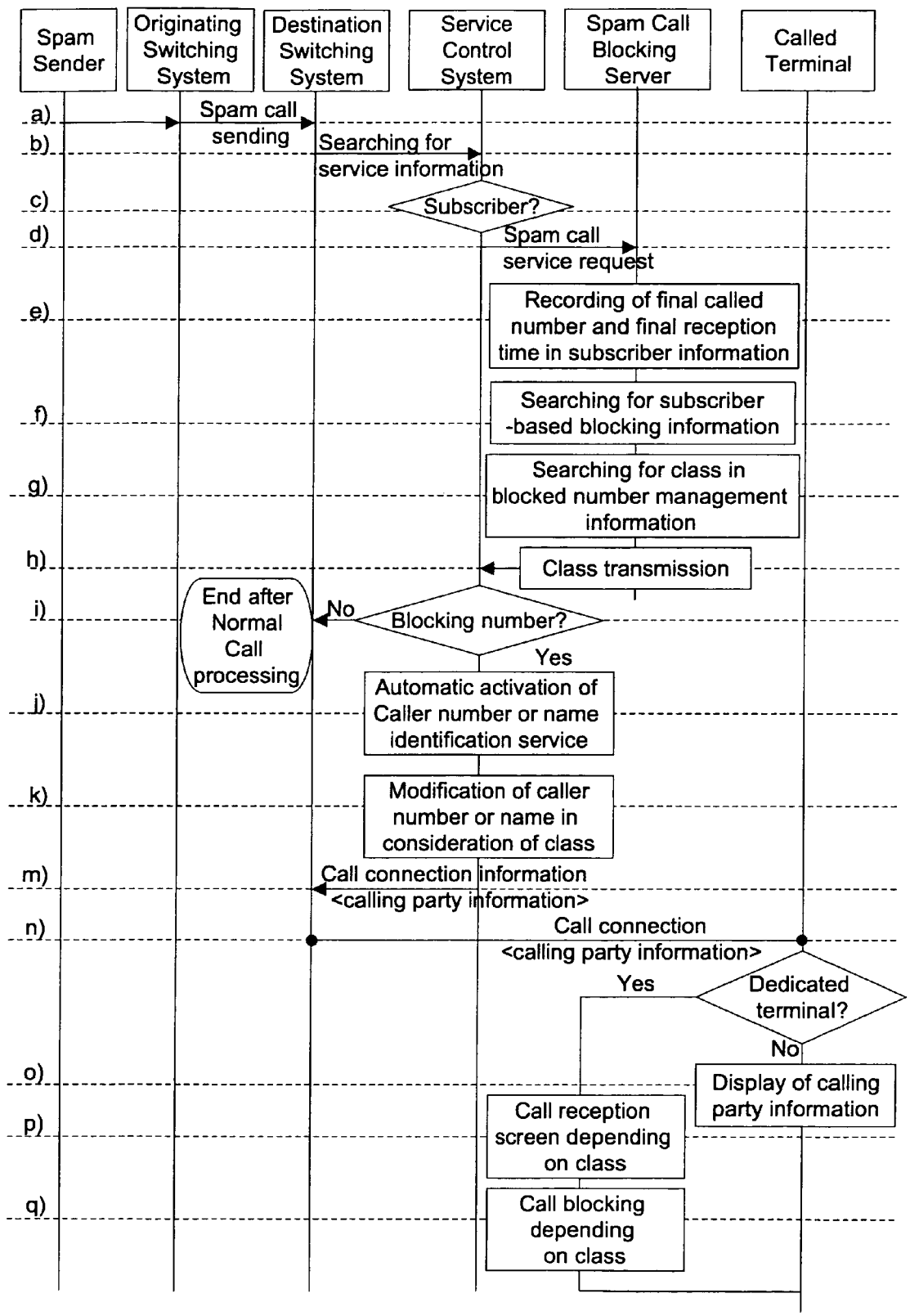
FIG. 8 shows a procedure of indicating the spam classes of spam calls according to the present invention.

FIG. 7 illustrates a procedure of switching and blocking a call from a blocked telephone number when such a call is received by a subscriber. A call from a telephone number blocked directly by the subscriber, as illustrated in FIG. 3, is immediately blocked, and a call the class of which is equal to or higher than the class set by the subscriber is blocked, as shown in FIG. 4.

a) A spam sender sends a spam call. The spam sender may be a wired or mobile telephone subscriber.

b) A destination switching system requests a 'service control system' to search and perform service to which the called party subscribed. The service control system is an apparatus that participates in a procedure of connecting a telephone call and provides various type of additional service. In general, an SCP or HLR is used as the service control system. In the case of a wireless network, an HLR may be used, while in the case of a wired network, an SCP may be used. In the case of a wired network, the destination switching system itself may inquire whether to the service has been subscribed to, while in the case of a mobile network, whether the service has been subscribed to be inquired of the 'service control system'.

c) The service to which the called party has subscribed is identified.

d) If the called party is a subscriber to the present service, the spam call blocking server is requested to perform the present service.

e) The calling number is recorded in FIG. 6 as 'final reception information', and 'final reception time' is also recorded.

f) The spam call blocking server inquires of the information of FIG. 3 about 'spam status' for <subscriber telephone number, blocked number> using a called party number and a calling party number.

g) If the spam status of FIG. 3 is 'blocked', step 1) steps subsequent thereto are performed.

h) A blocking class is inquired of FIG. 6. If the blocking class is 'none', step k) is performed.

i) The class of the calling number is found in FIG. 4.

j) If the class of the calling number is equal to or higher than a class set by a user, blocking is performed. That is, step 1) and steps subsequent thereto are performed.

k) This step corresponds to the case of connection without blocking. When the service control system is notified of normal call processing, the service control system orders the destination switching system to perform normal call processing.

l) This step corresponds to the case of blocking a call.

m) The service control system is notified of the connection number of the voice module of the spam call blocking server.

n) The service control system provides notification of the result so that the destination switching system can be connected to the connection number.

o) The destination switching system connects the call to the voice module of the spam call blocking server.

p) The spam call blocking server transmits a guide broadcast.

q) The spam call blocking server may additionally deal with the step of raising an 'objection'. That is, this step is the step at which the calling party raises an objection to the blocking of the call.

r) The guide call is terminated. Alternatively, a call is automatically terminated by the calling party.

FIG. 8 illustrates a procedure of visually/auditorily indicating the spam class of a received call on a terminal, so that a called party determines whether to receive a call, and, in the case of a dedicated terminal, providing a function of blocking calls at a terminal. In particular, this procedure automatically activates caller telephone number identification service or caller name identification service and modifies information, so spam calls can be automatically and visually displayed at a general terminal.

a) This step is the same as the step a) of FIG. 7.

b) This step is the same as the step b) of FIG. 7.

c) This step is the same as the step c) of FIG. 7.

d) This step is the same as the step d) of FIG. 7.

e) This step is the same as the step e) of FIG. 7.

f) If, with reference to FIG. 3, the spam status of the calling number is 'blocked', the blocking class for the calling number is considered to belong to the highest class. When the class is determined, step h) and its subsequent steps are performed.

g) With reference to FIG. 4, the class of the calling number is found.

h) The found class is transmitted to the service control system.

i) If the calling number is not a blocked number, normal call processing is performed and the procedure is terminated. If the calling number has a blocking class, step j) and steps subsequent thereto are performed.

j) If the called party is not a subscriber to 'caller number identification service', the called party is considered to be a subscriber to the service and the service is activated. Furthermore, if the called party is not a subscriber to 'caller name identification service', this service is activated. In the case where the calling party does not provide a calling party name, the call is received via a wired network without the indication of a calling party name, the calling party uses 'caller name identification restriction service' or there is no 'caller name' due to roaming or the like, spam class information is included, as at step k).

k) In the case of use of 'caller number identification service', a spam class is indicated by adding characters to the calling party telephone number. For example, the spam class is indicated using the number of '*', as in 'calling number+***', or using a changed character. Accordingly, when the spam class is low, the spam class is indicated in the form of 'calling number+*'. Meanwhile, there are cases where two calling numbers are used depending on the network, in which case a spam class is indicated in place of any one of the calling numbers.

Furthermore, in the case of using caller name identification service, the name set by the calling party is replaced with characters indicating the spam class, or spam class characters are added to the name set by the calling party. In the case where there is no name set by the calling party, spam class characters are newly entered. That is, spam class characters, such as 'high spam', are replaced with or added to the name set by the calling party. These characters may be various modified.

l) The call connection information is reported to the destination switching system. In this case, data about the previous set caller number identification service or caller name identification service is included in the call connection information.

m) The destination switching system makes a call with the called party. At this time, the data described at step l) is transmitted together.

n) When the called terminal is a general terminal and a 'caller number identification service'-enabled terminal, the number set at step k) is output and character '*', with which the called party can visually identify the degree of spam. Furthermore, when the terminal is a 'caller name identification service'-enabled terminal, the name set at step k) ('high spam') is displayed on the screen of the called terminal, therefore called party visually identify the degree of spam.

o) In the case of a dedicated terminal, information about 'calling number' or 'calling name' modified at step k) is analyzed, the spam class is determined, and the spam call is indicated via a visual still image or moving image designated for the class. Furthermore, a visual identification function is provided by outputting a designated ring tone. When vibration is set for the terminal, the ring tone is not issued. The function can be set by the called party for the called terminal.

p) Through the setting of the called party, the terminal provides class-dependent call blocking or automatic response function.

In the case of providing identification service using 'caller name identification service' in FIG. 8, steps i) to k) are performed directly by the spam call blocking server according to the configuration of the network. In this case, the configuration of the network may be achieved in such a way that, in a mobile network, the service control system is formed of an HLR and the spam call blocking server is formed of an SCP.

Figure 9:
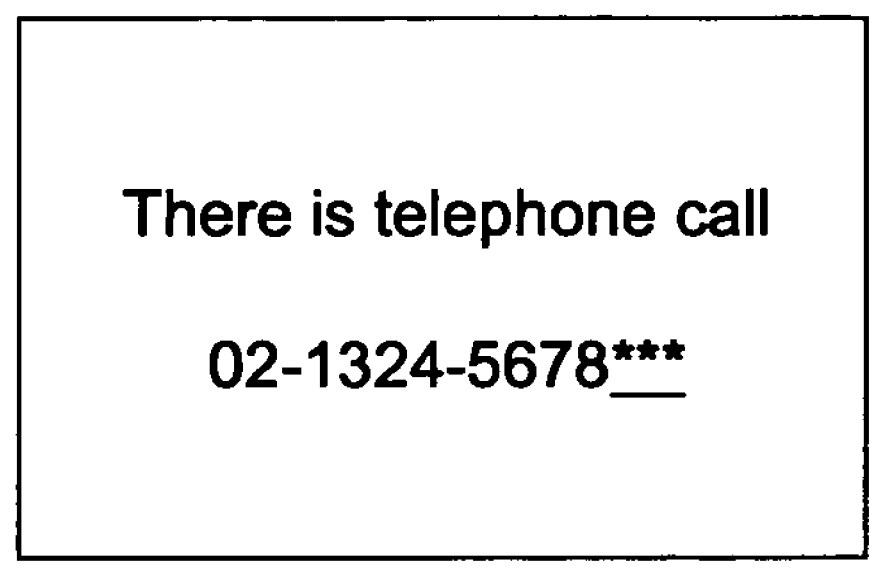

FIG. 9 is a view showing the visual display of a spam call at the time of outputting a calling number through a general terminal having a caller number identification function. The display corresponds to the results of setting performed at step k) of FIG. 8. The called party can be aware of a spam call and a class via a calling number and '***'.

FIG. 10 is a view showing the visual display of a spam call at the time of outputting the name of a calling party through a general terminal having a caller name identification function. The display corresponds to the results of setting performed at step k) of FIG. 8. The called party can be aware of a spam call and a class via a calling number and '[high spam call]'.

Figure 11:
FIG. 11 is a view illustrating visual display using an image through a dedicated telephone according to the present invention.

FIG. 11 is a view showing display on a dedicated terminal that can recognize a calling number and the name of a calling party modified and designated by the spam call blocking server and determine the spam call and the spam class. In this case, a spam call is visually displayed via a preset still image or moving image, and is auditorily indicated via a set ring tone.

Figure 12:
FIG. 12 is a view illustrating visual display using a text message indicating the blocking of a spam call and an image through a dedicated telephone according to the present invention.

FIG. 12 is a view illustrating the case of recognizing a calling number and the name of a calling party modified and designated by the spam call blocking server and blocking the reception of spam calls via a terminal. When a spam call having a class equal to or higher than a class set by the called party is received, the spam call is automatically blocked.

Although the preferred embodiments of the present invention have been described above, it is apparent to those skilled in the art that the present invention is not limited to the preferred embodiments, and various modification, changes, variations and replacements can be made without departing from the gist of the present invention.

For example, in step k) of FIG. 8, and FIGS. 9, 10 and 11, methods of modifying and outputting the calling number and the calling name may vary according the characters used.

Furthermore, depending on the configuration of the wired network and the mobile network, the service control system and the spam call blocking server may be integrated into a single system or may be separately constructed.

Furthermore, step e) of FIG. 2 may utilize an additionally registered channel, such as an SMS channel, depending on the method in which the terminal can connect to the spam call blocking server.

Furthermore, the classes of FIG. 4 may be set in a different manner.

Meanwhile, the sequence of the reporting procedure of FIGS. 1 and 2 is not dependent on the procedure. That is, all occur at the same time, therefore the termination may be performed before or after.

When the above-described present invention is used, spam calls delivered unilaterally from a telephone network to a called party can be automatically identified and blocked, and the called party can visually/auditorily identify the spam calls.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of visually or auditorily indicating spam status or a spam class for a calling number through a called terminal, comprising the steps of:

the destination switching system, which has received a spam call from a spam sender, requesting service from a spam call blocking server by delivering the calling number and a called number to the spam call blocking server;

the spam call blocking server, which has received the request for service, inquiring about spam status or a spam class for the calling number using the calling number and the called number;

if the spam status is 'blocked', or if the spam status is 'blocked' and the spam class is equal to or higher than a predetermined class, the spam call blocking server transmitting the spam status or spam class to the service control system;

the service control system activating caller identification service of a called party;

after the activation, the service control system including information about the spam status or spam class in caller identification information for the caller identification service;

the service control system transmitting call connection information and the caller identification information to a destination switching system and, thus, the destination switching system making a call with a called terminal; and the destination switching system delivering the caller identification information to the destination terminal and, thus, providing visual or auditory display corresponding to the spam status or spam class through the called terminal.

2. The method as set forth in claim 1, wherein the caller identification service is a caller number identification service.

3. The method as set forth in claim 1, wherein the caller identification service is a caller name identification service.

4. The method as set forth in claim 1, wherein the visual display is display of the spam status or spam class in text form.

5. The method as set forth in claim 1, wherein the visual display is display of the spam status or spam class in image form.

6. The method as set forth in claim 1, wherein the auditory display is a ring tone designated for the spam status or spam class.

7. The method as set forth in claim 1, wherein the auditory display is a voice guide designated for the spam status or spam class.

8. The method as set forth in claim 1, wherein the spam status stored in the spam call blocking server is determined in such a way that a called party of a general telephone notifies the spam call blocking server that a call received immediately before the notification is a spam call after termination of the spam call by pressing a specific telephone number and a call button for connection to the spam call blocking server.

9. The method as set forth in claim 1, wherein the spam status stored in the spam call blocking server is determined in such a way that a called party of a general telephone notifies the spam call blocking server of a spam number by pressing a specific telephone number, spam telephone number and a call button for connection to the spam call blocking server.

10. The method as set forth in claim 1, wherein the spam status stored in the spam call blocking server is determined in such a way that a called party of a dedicated telephone selects a dedicated button or a menu for connection to the spam call blocking server and, thus, notifies the spam call blocking server that a call received immediately before the notification is a spam call after termination of the spam call.

11. The method as set forth in claim 1, further comprising the step of the called party subscribing to spam call blocking service before the step of requesting;
wherein the spam call blocking server is provided with an option that is used to determine whether to apply spam call blocking, which is determined by the spam status, to all subscribers.

12. The method as set forth in claim 1, wherein the spam class is determined in consideration of a blocking rate, an allowing rate and a number of received calls with respect to a blocked number.

13. The method as set forth in claim 1, wherein the service control system is a Service Control Point (SCP) of a wired network.

14. The method as set forth in claim 1, wherein the service control system is a Home Location Register SCP of a wireless network.

* * * * *